Aug. 29, 1967   B. S. ROBERTS ET AL   3,338,430
PALLET TRANSFER MECHANISMS
Filed Dec. 28, 1964   5 Sheets-Sheet 1
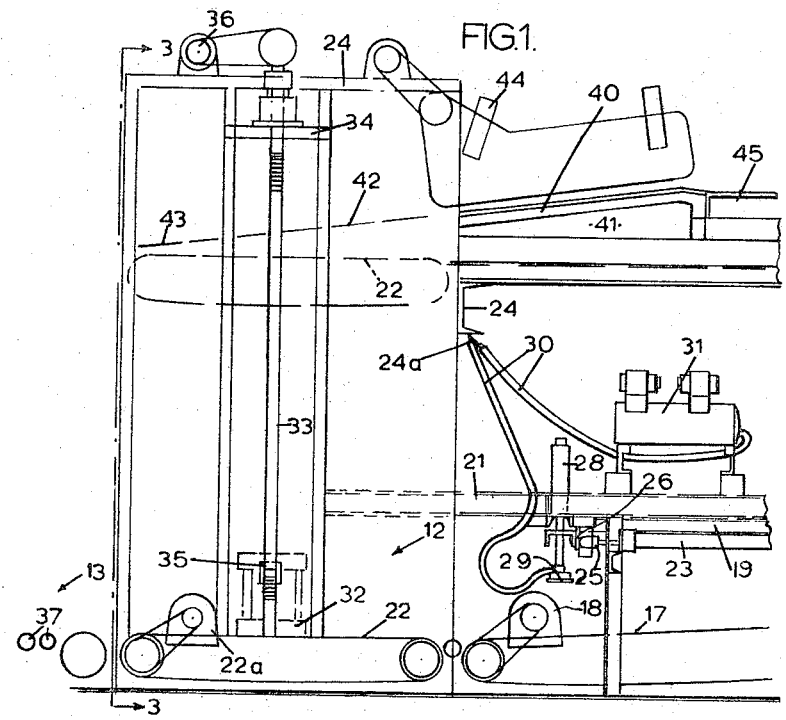
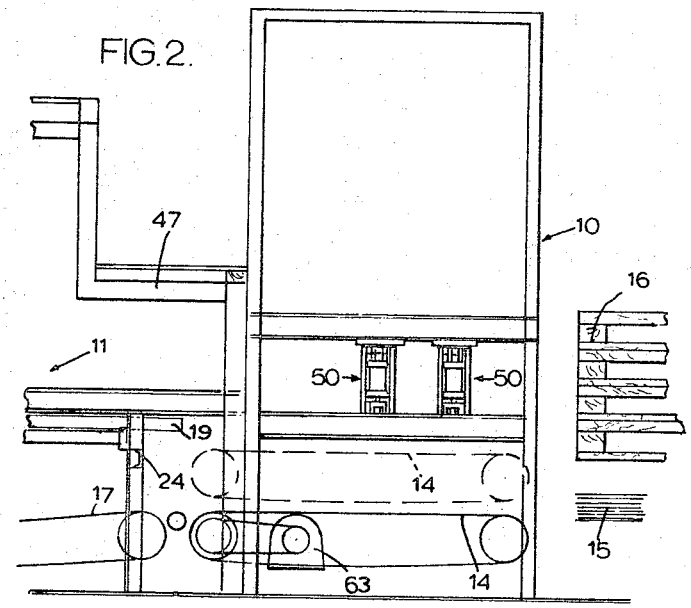
BARRY SAMUEL ROBERTS
FRANCIS DUNCAN SHELDON
INVENTORS
Harry Ernest Lubens
ATTORNEY

BARRY SAMUEL ROBERTS
FRANCIS DUNCAN SHELDON
INVENTORS

Harry Ernest Rubens
ATTORNEY

BARRY SAMUEL ROBERTS
FRANCIS DUNCAN SHELDON
INVENTORS

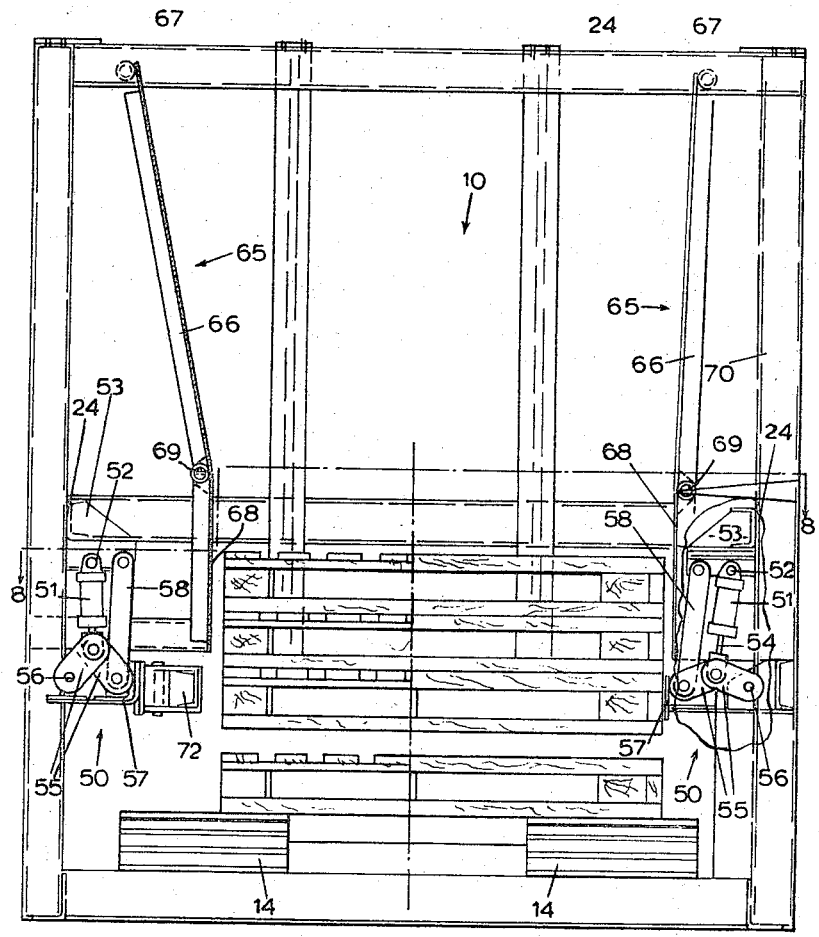

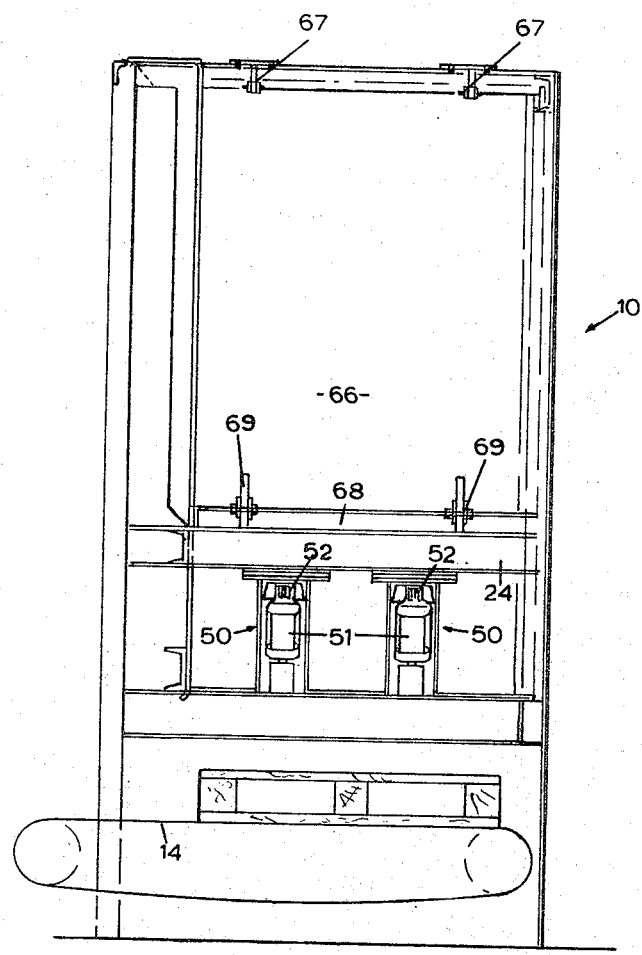

３,338,430
PALLET TRANSFER MECHANISMS
Barry Samuel Roberts, Wolverhampton, and Francis
Duncan Sheldon, Birmingham, England, assignors to
Lawrence Engineering Company Limited, Tividale, Tipton, Staffordshire, England, a British company
Filed Dec. 28, 1964, Ser. No. 421,468
Claims priority, application Great Britain, Jan. 18, 1964,
2,291/64, 2,292/64
11 Claims. (Cl. 214—6)

This invention relates to pallet transfer mechanisms particularly but not exclusively, for incorporation or incorporated in pallet loading mechanisms. The term "pallet" as used in this specification includes the conventional form of timber or metal pallet and also the fiber board form of pallet known as a skidstack board or pallet.

It is an object of the invention to provide a pallet transfer mechanism particularly but not exclusively suited for handling the skidstack form of pallet.

In accordance with the invention a pallet transfer mechanism comprises a storage station, a further station, a transfer frame traversable between the storage and further stations, and supporting means on the transfer frame for engaging and supporting the uppermost pallet of a stack of pallets in the storage station whilst transferring said pallet from the storage station to the further station.

In accordance with the invention also a pallet loading mechanism comprises a pallet transfer mechanism as specified in the next preceding paragraph.

A pallet transfer mechanism which is a typical example of the invention will now be more particularly described with reference to the accompanying diagrammatic drawings, in which it is shown incorporated in a pallet loading mechanism.

In the accompanying drawings:

FIGURES 1 and 2 are continuations of one another of a side elevation of the pallet loading mechanism;

FIGURE 6 is a rear elevation of a modified pallet loading mechanism sectioned along the line 6—6 in FIGURE 8;

FIGURE 7 is a cut-away side elevation of the part of the mechanism shown in FIGURE 6.

Figure 3:
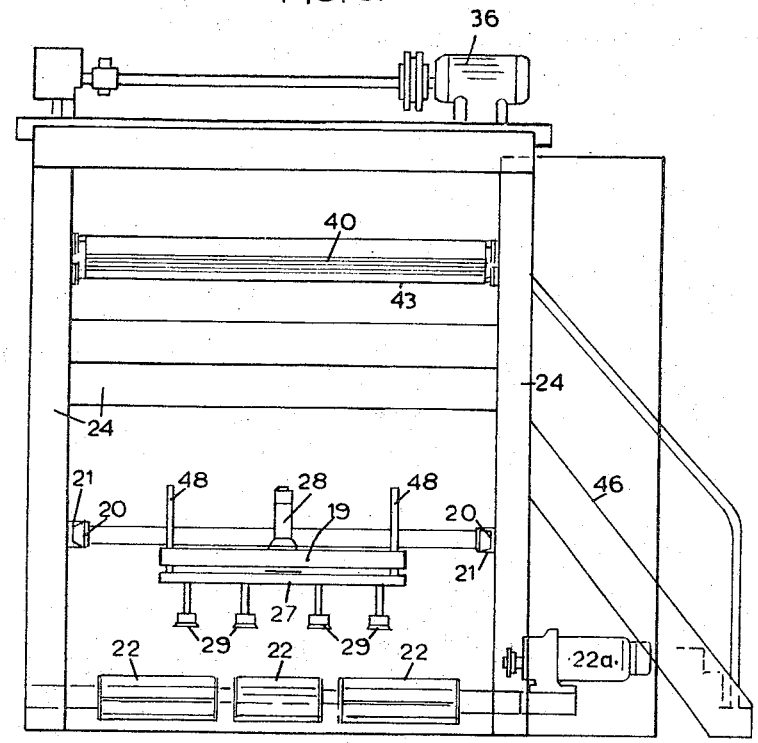
FIGURE 3 is a front elevation of the pallet loading mechanism on the line 3—3 of FIGURE 1.

The pallet loading mechanism as shown in the drawings (see FIGURES 1–3) includes a pallet transfer mechanism which comprises a pallet magazine 10, a storage station 11, a further station 12, and a delivery conveyor 13.

The pallet magazine 10 comprises a pallet magazine conveyor 14 which is movable between upper and lower positions (indicated in FIGURE 2 in dashed and full lines respectively) on a platform 64 (see FIGURES 4 and 5) by elevating means in the form of a hydraulic hoist (not shown), the platform 64 also carries a motor 63 for driving the conveyor 14. The function of the pallet magazine 10 is to receive a stack 15 of skidstack pallets or a stack 16 of non-skidstack pallets on the conveyor 14, and to pass the pallets on to the storage station 11. The pallet magazine 10 is more adequately described below.

The storage station 11 comprises a storage station conveyor 17 which is approximately horizontally aligned with the pallet magazine conveyor 14 when the latter is in its lower position. The conveyor 17 is fixed in position; and an electric motor 18 is shown for driving the conveyor 17. The storage station 11 also comprises a transfer frame 19 mounted above the conveyor 17 by rollers 20 received in and supported by a pair of parallel facing horizontal guide channels 21. The guide channels 21 extend away from the storage station conveyor partly over a further station conveyor 22.

The transfer frame 19 is movable along the guides 21 by a double acting pneumatic ram of which the cylinder 23 is fixed to the mechanism framework 24, and the piston 25 is connected to the frame 19 through a lug 26 depending therefrom. The transfer frame 19 is provided with a transverse beam 27 at its end adjacent the further station 12, the height of said beam 27 being adjustable by means of a vertically positioned double acting ram 28. Four suction heads 29 are fixed to the transverse beam 27 and face downwardly towards the conveyor beneath, their separation from said conveyor being dependent on the adjustment afforded by the ram 28, the beam 27 being guided by rods 48 sliding through apertures in the frame 19. The suction heads are connected through a flexible vacuum line 30 (see FIGURE 1) with suction apparatus 31 mounted in a fixed position above the transfer frame 19. The line 30 is looped about a fixed support 24a for convenience.

The further station 12 comprises the further station conveyor 22 which is a horizontal loading conveyor 22 aligned, when at its lowest position, with the storage station conveyor 17 at one end, and with the delivery conveyor 13 at the other end. The loading conveyor 22 has a driving motor 22a and is mounted and constitutes part of a Lowerator mechanism; each one of a pair of the threaded rods 33 journalled in a sub-frame 34 fixed to an upper part of the mechanism framework 24 passes through a complementary tapped part 35 of the carriage 32, and is rotatable in synchronism with the other rod 33 by means of an electric motor 36 to lift or lower the carriage 32 and hence the loading conveyor 22.

Figure 4:
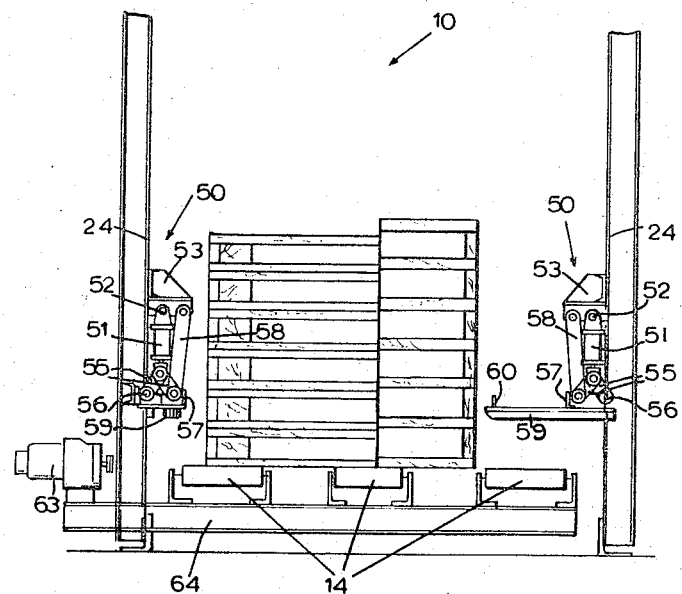
FIGURES 4 and 5 are cut-away rear elevations of the pallet loading mechanism in opposite operational stages.

The delivery conveyor 13, of which part only is shown in FIGURE 4 comprises three parallel and spaced tracks of rollers 37 leading from the further station 12 away from the framework 24. The conveyor 13 is provided with limit switches and electromagnetically braked motors (not shown) for controlling rotation of selected groups of the rollers, whereby a loaded pallet is fed to the end of the conveyor to await removal, for example by a fork lift truck, and further pallets are halted before contacting the end pallet or each other. When the end pallet has been removed, the other pallets are conveyed to locations in which a further pallet is positioned at the end of the delivery conveyor 13 and other pallets are halted as before.

The mechanism also comprises a loading platform 40 located above the storage station 11 and a stripper plate 41 retractable beneath the loading platform 40 from a location shown in dashed lines at 42 forming an extension to said loading platform 40 above the further station 12.

The loading platform 40 and stripper plate 41 are known and so are only diagrammatically shown. The stripper plate 41 is generally of a wedge shape in section, of which the apex is a pivoted plate 43 which lies remote from the loading platform 40 when the stripper plate 41 is in its protracted position. Said plate 41 and platform 40 have bearing surfaces constituted by a plurality of freely mounted rollers, and slope downwardly towards the apex plate 43. Thus an article placed on the uppermost part of the loading platform 40 would pass over the rollers under the action of gravity to the apex plate 43 but for the provision of a transverse stop bar system 44 between the loading platform 40 and the stripper plate 41.

The loading platform 40 is provided with a transversely directed feed conveyor 45 whereby articles such as cartons or sacks to be stacked on a pallet are fed to said platform 40. A stair 46 and walk-way 47 are provided in the framework 24 for an operator facing the Lowerator mechanism to work across the feed conveyor 45 on to the loading platform 40.

Figure 5:
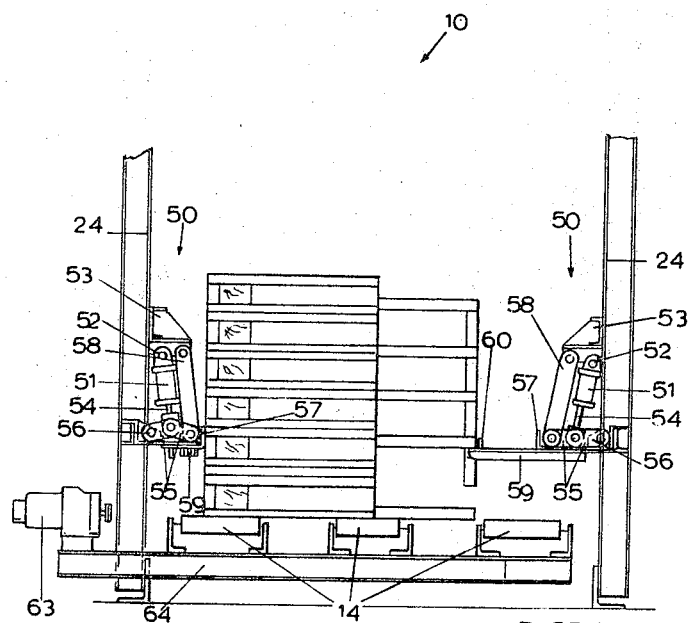

Referring now additionally to FIGURES 4 and 5, the pallet magazine 10 comprises two pairs of spaced holding means 50 for supporting non-skidstack pallets of the stack 16, one pair of said means 50 to each side of the magazine 10. The front of the magazine 10 adjacent the storage station 11 is open adjacent the conveyor 14 to permit passage of pallets to the storage station 11, whilst the rear of the magazine is perpetually open whereby further pallets can be added to any stack 15 or 16 in the magazine 10.

Each of the holding means 50 comprises an approximately vertical double-acting pneumatic ram of which the cylinder 51 is pivoted at 52 to a bracket 53 secured to the framework 24, and the piston rod 54 terminates at the pivoted connection between two links 55 constituting a toggle linkage. One of the links 55 is pivoted to the framework 24 at 56, whilst the other link is pivoted to an angle member 57. Each member 57 is connected to the bracket 53 through an arm 58 to swing about the bracket 53 under the action of the ram and links 55. The angle member 57 carries engaging means therebeneath for supporting contact with non-skidstack pallets, said engaging means being in the form of a beam 59 pivoted adjacent one end to the angle member 57 and having a stop 60 adjacent its other end. For large non-skidstack pallets the beams 59 are disposed lying along the angle members 57 so as not to project beyond the angle members 57 towards the pallets, as can be seen on the left hand side of FIGURES 4 and 5; for small non-skidstack pallets the beams 59 are disposed projecting towards the pallets as can be seen on the right hand side of FIGURES 4 and 5.

The beams 59 are disposed at an elevation in relation to the pallet magazine conveyor 14, such as to support the lowest but one non-skidstack pallet of the stack 16 when the conveyor 14 is slightly above its lower position, whilst the conveyor 14 when at or approaching its upper position will contact and support said pallet.

Figure 8:
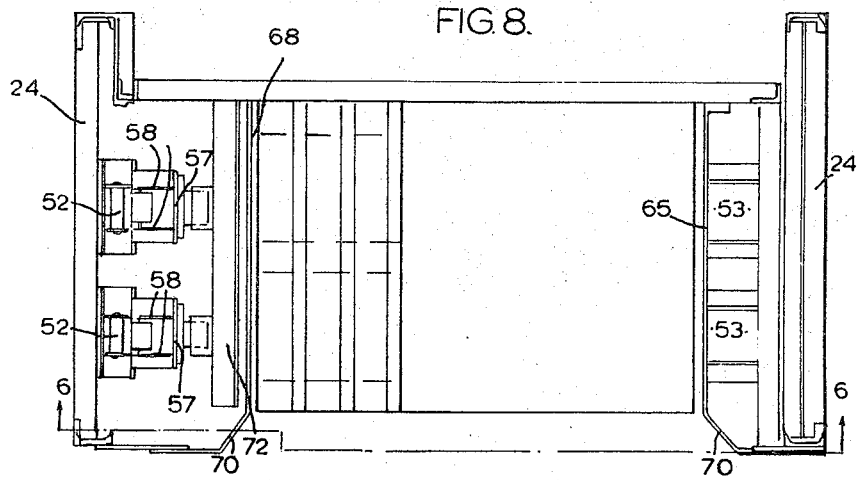
FIGURE 8 is a sectional view taken along the line 8—8 in FIGURE 6.

FIGURES 6, 7, and 8 show the pallet magazine 10 in greater detail by including the adjustable side walls 65 each comprising an upper part 66 pivoted at 67 to the mechanism framework 24, and a lower part 68 for vertical hanging from pivots 69 at the lower edge of the upper part 66. The sides of the walls at the rear end of the magazine 10 are extended laterally of the mechanism as at 70 (FIGURE 8) whereby insertion of pallets into the magazine is facilitated. The purpose of the side walls 65 is to centralize the stacks 15 or 16 on the conveyor 14, this having the effect also of centralizing the positions of the pallets as they pass through subsequent stations in the mechanism.

FIGURES 6, 7 and 8 also show a modification of the mechanism as described above in that a modified form of pallet magazine conveyor 14 is utilised and that the angle members 57 do not have beams 59 but abut non-skidstack pallets themselves when said pallets are large, as shown on the right hand side of FIGURE 6 or through spacers 72 when said pallets are small as shown on the left hand side of FIGURE 6.

In use, a stack 15 or 16 of pallets is placed for example by a fork-lift truck, in the pallet magazine 10 on the pallet magazine conveyor 14 in its upper position. The side walls 65 of the pallet magazine 10 are manually adjusted, before placing of said stack of pallets, to centralize the stack 15 or 16 in the mechanism. If non-skidstack pallets are to be used the holding means 50 are adjusted to accommodate the required width as outlined above, for example by positioning the beams 59 in either of the positions shown in FIGURE 4.

If a stack 15 of skidstack pallets is used the pallet magazine conveyor 14 is lowered and actuated in its lower position in unison with the storage station conveyor 17 to feed the whole stack of 15 of pallets into the storage station 11, whereupon a further stack 15 of pallets can be placed in the pallet magazine 10. As each pallet is required in the further station 12 for loading, the suction heads 29 are lowered from the transfer frame 19 on the transverse beam 27 to contact and then support the uppermost pallet of the stack, and said frame 19 is then transferred to the further station 12 by movement along the guide channels 21 under the action at the ram 23, whereupon said pallet is deposited on the loading conveyor 22. The transfer frame 19 is then returned to the storage station 23 by reverse action of the ram. When the last pallet of the stack 15 on the storage station conveyor 17 is removed, a further stack 15 is conveyed from the pallet magazine 10 on to the storage station conveyor 17.

If non-skidstack pallets are used, the pallet magazine conveyor 14 is lowered from its upper position during which lowering holding means 50 are actuated to effect engaging contact with the lowest pallet but one to support it and hence the pallets above it. Actuation of the holding means 50 is effected by downward movement of the piston rods 54 from the positions shown in FIGURE 4 to those of FIGURE 5 hence tending to align the links 55, and swinging the angle members 57 outwardly until supporting contact is made with the required pallet. The conveyor 14 is fully lowered to its lower position carrying the lowermost pallet, and is then actuated in unison with the storage station 11. The conveyor 14 is elevated once more to its upper position contacting the held pallet, the holding means 50 are released, and again, as above, are re-actuated to grip and support the lowest pallet but one as the conveyor 14 is lowered with the lowermost pallet. When a pallet is required in the further station 12, the conveyors 14, 17 and 22 are actuated in unison to pass the pallet in the storage station 11 onto the loading conveyor 22, and the pallet on the pallet magazine conveyor 14 onto the storage station conveyor 17.

Regardless of whether the pallet is of the skidstack form or not, as soon as it is received on the loading conveyor 22, and the transfer frame 19 is in the storage station 11, the Lowerator is operated in reverse to carry the pallet on the carriage 32 to its uppermost position. As soon as the operator has assembled a layer of the articles to be loaded on the loading platform 40, the stripping plate 41 is protracted, the stop bar system 44 is operated, and said layer is carried by the rollers onto the stripping plate 41. The operator can proceed to assemble a further layer on the loading platform 40 when the stripper plate 41 is withdrawn with the articles sliding over the apex plate 43 and being deposited gently on to the pallet.

The Lowerator is lowered after each layer is deposited on the growing stack thereon to place the top of the stack in the correct position for receiving a further layer.

As soon as the requisite number of layers is received on each pallet, the Lowerator is lowered to its bottom position and the loading conveyor 22 is actuated to pass the pallet and stack of articles onto the delivery conveyor 13. A fresh pallet is simultaneously fed onto the loading conveyor 22 either by the transfer frame 19 or the storage station conveyor 17 according to the form of pallet being handled.

We claim:
1. A pallet transfer mechanism capable of alternatively handling both skidstack and non-skidstack pallets, comprising:
 (i) a pallet magazine,
 (ii) separating means in the pallet magazine, operable vertically to separate a non-skidstack pallet from a stack of non-skidstack pallets,
 (iii) a storage station,
 (iv) a first powered conveyor position between the pallet magazine and the storage station and alternatively operable,
  (a) to convey a separated non-skidstack pallet from the pallet magazine to the storage station, and (b) to convey an entire stack of skidstack pallets from the pallet magazine to the storage station, (v) a further station, (vi) supporting means operable to engage and support the uppermost skidstack pallet of a stack of skidstack pallets in the storage station, (vii) a transfer frame carrying the supporting means and being reciprocable between the storage station and the further station to transfer to the further station a skidstack pallet engaged and supported by the supporting means, and (viii) a second powered conveyor positioned between the storage station and the further station and operable to convey a non-skidstack pallet from the storage station to the further station.

2. A mechanism as claimed in claim 1, wherein the supporting means comprises a plurality of suction members dependent from the transfer frame.

3. A mechanism as claimed in claim 1, further comprising adjustment means operable to adjust the vertical position of the supporting means relative to the transfer frame to effect engagement of the supporting means with a pallet in the storage station.

4. A mechanism as claimed in claim 1, comprising horizontally extending guides reciprocably mounting the transfer frame.

5. A mechanism as claimed in claim 4, comprising a fluid-powered ram operable to effect reciprocation of the transfer frame on the guides.

6. A mechanism as claimed in claim 1, wherein the separating means comprises an elevator operable to raise a stack of non-skidstack pallets, and holding means operable to hold the pallet adjacent the lowermost pallet in the raised position, the elevator also being operable to lower the lowermost pallet whilst the remainder of the stack is held in the raised position.

7. A mechanism as claimed in claim 6, wherein the elevator comprises a third powered conveyor disposed in the pallet magazine, and a fluid powered ram connected to the third conveyor and operable to raise and lower the latter.

8. A mechanism as claimed in claim 6, wherein the holding means comprises:

(i) a plurality of engaging means positioned at opposite sides of the pallet magazine, (ii) a plurality of toggle linkages having extreme ends respectively pivotally connected to fixed parts of the pallet magazine and to the engaging means, and (iii) at least one fluid powered ram connected to the toggle linkages and operable to actuate the latter so as to move the engaging means at respective sides of the pallet magazine towards and away from one another.

9. A mechanism as claimed in claim 1, wherein the pallet magazine comprises side walls disposed on opposite sides of the first conveyor, and means for adjustably positioning the side walls relative to each other according to the width of the pallets being handled, whereby pallets conveyed by the pallet magazine are centralised thereon by the side walls.

10. A pallet transfer mechanism capable of alternatively handling both skidstack and non-skidstack pallets, comprising:

(i) a pallet magazine, (ii) separating means in the pallet magazine, operable vertically to separate a non-skidstack pallet from a stack of non-skidstack pallets, (iii) a storage station, (iv) a first powered conveyor positioned between the pallet magazine and the storage station and alternatively operable, (a) to convey a separated non-skidstack pallet from the pallet magazine to the storage station, and (b) to convey an entire stack of skidstack pallets from the pallet magazine to the storage station, (v) a further station, (vi) a plurality of suction members operable to engage and support the uppermost skidstack pallet of a stack of skidstack pallets in the storage station, (vii) a transfer frame carrying the supporting means in dependence therefrom and being reciprocable between the storage station and the further station to transfer to the further station a skidstack pallet engaged and supported by the suction members, (viii) adjustment means operable to adjust the vertical positions of the suction members relative to the transfer frame to effect engagement of the suction members with a pallet in the storage station, and (ix) a second powered conveyor positioned between the storage station and the further station and operable to convey a non-skidstack pallet from the storage station to the further station.

11. A mechanism as claimed in claim 10, wherein the adjustment means is a fluid-powered ram.

References Cited

UNITED STATES PATENTS

| | | | |
|---|---|---|---|
| 2,633,251 | 3/1953 | Bruce | 214—6 |
| 2,655,271 | 10/1953 | Cole et al. | 214—6 |
| 2,701,650 | 2/1955 | Stevenson | 214—6 |
| 2,947,405 | 8/1960 | Fenton | 214—6 |
| 3,120,312 | 2/1964 | Hudak | 214—6 |
| 3,143,222 | 8/1964 | Caskie | 214—6 |
| 3,219,203 | 11/1965 | Jeremiah | 214—6 |

GERALD M. FORLENZA, *Primary Examiner.*

J. E. OLDS, *Assistant Examiner.*